United States Patent
Tsai et al.

(10) Patent No.: US 10,330,859 B2
(45) Date of Patent: Jun. 25, 2019

(54) DISPLAY DEVICE AND BACKLIGHT MODULE

(71) Applicant: Coretronic Corporation, Hsin-Chu (TW)

(72) Inventors: Bing-Han Tsai, Hsin-Chu (TW); Jeng-Bin Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 228 days.

(21) Appl. No.: 15/187,792

(22) Filed: Jun. 21, 2016

(65) Prior Publication Data

US 2017/0146729 A1 May 25, 2017

(30) Foreign Application Priority Data

Nov. 19, 2015 (CN) .......................... 2015 1 0799459

(51) Int. Cl.
  *F21V 8/00* (2006.01)

(52) U.S. Cl.
  CPC .......... *G02B 6/0091* (2013.01); *G02B 6/009* (2013.01); *G02B 6/0018* (2013.01); *G02B 6/0031* (2013.01); *G02B 6/0065* (2013.01); *G02B 6/0088* (2013.01); *G02B 6/0055* (2013.01)

(58) Field of Classification Search
  CPC ... G02B 6/0031; G02B 6/0028; G02B 6/0055
  USPC .................................................. 362/606, 633
  See application file for complete search history.

(56) References Cited

U.S. PATENT DOCUMENTS

| | | | | |
|---|---|---|---|---|
| 7,744,265 B2 * | 6/2010 | Kang | ................... | G02B 6/0086 257/84 |
| 9,983,340 B2 * | 5/2018 | McCollum | ................ | F21V 5/00 |
| 10,094,965 B2 * | 10/2018 | Tsai | ...................... | G02B 6/0035 |
| 2001/0017773 A1 * | 8/2001 | Suzuki | .............. | G02F 1/133615 362/23.15 |
| 2006/0002678 A1 * | 1/2006 | Weber | .................. | G02B 6/0008 385/146 |
| 2007/0103854 A1 | 5/2007 | Yu et al. | | |

(Continued)

FOREIGN PATENT DOCUMENTS

| | | |
|---|---|---|
| CN | 101603657 | 12/2009 |
| CN | 202253175 | 5/2012 |

(Continued)

OTHER PUBLICATIONS

"Office Action of China Counterpart Application," dated Mar. 19, 2019, p. 1-p. 11.

*Primary Examiner* — William N Harris
(74) *Attorney, Agent, or Firm* — JCIPRNET (57) ABSTRACT

A display device including a backlight module and a display panel is provided. The backlight module includes a frame, a light guide element, and a light source. The light guide element is connected to the frame and has a light incident surface, a light emitting surface, and a back surface. The back surface is opposite to the light emitting surface and serves as an appearance surface of the display device. The light source is disposed in the frame and aligned with the light incident surface. The display panel is connected to the frame, and the light emitting surface faces the display panel. A backlight module is also provided. The display device and the backlight module provided in the invention are thinner and lighter, and have a desirable appearance.

29 Claims, 6 Drawing Sheets

(56) References Cited

U.S. PATENT DOCUMENTS

| | | | | |
|---|---|---|---|---|
| 2008/0002393 A1* | 1/2008 | Moon | ............ | G02B 6/0006 |
| | | | | 362/97.1 |
| 2008/0260328 A1* | 10/2008 | Epstein | ............ | G02B 6/0018 |
| | | | | 385/32 |
| 2009/0273931 A1* | 11/2009 | Ito | ............ | G02B 6/0018 |
| | | | | 362/267 |
| 2010/0315570 A1 | 12/2010 | Mathew et al. | | |
| 2014/0029295 A1 | 1/2014 | Hsiao et al. | | |
| 2014/0360576 A1 | 12/2014 | Plotnikov et al. | | |
| 2016/0033817 A1 | 2/2016 | Hsiao et al. | | |
| 2016/0313593 A1* | 10/2016 | Grip | ............ | G02F 1/13452 |

FOREIGN PATENT DOCUMENTS

| | | |
|---|---|---|
| CN | 102608801 | 7/2012 |
| CN | 102691936 | 9/2012 |
| CN | 103511922 | 1/2014 |
| CN | 204009291 | 12/2014 |
| CN | 204101843 | 1/2015 |
| JP | H05273548 | 10/1993 |
| TW | 200944878 | 11/2009 |

\* cited by examiner

DISPLAY DEVICE AND BACKLIGHT MODULE

CROSS-REFERENCE TO RELATED APPLICATION

This application claims the priority benefit of China application serial no. 201510799459.7, filed on Nov. 19, 2015. The entirety of the above-mentioned patent application is hereby incorporated by reference herein and made a part of this specification.

BACKGROUND OF THE INVENTION

Field of the Invention

The invention relates to a display device and a backlight module, and particularly relates to a display device and a backlight module having a light guide element.

Description of Related Art

With the prosperous development of the semiconductor industry and relevant electronic industries, smart phones, notebooks, and other digital display devices are being developed to become more convenient and multi-functional and exhibit an attractive design. When using these products, the display is an indispensable interface. Currently, liquid crystal display (LCD) has become the mainstream of displays. Since the liquid crystal panel of a liquid crystal display device itself does not emit light, a backlight module is required in the liquid crystal display device to obtain the light required to display a frame.

In the conventional assembling process, the backlight module and the liquid crystal panel are normally assembled into a liquid crystal display module (LCM). Then, the liquid crystal display module is adhered to a case and assembled with wirings and parts. Then, the case is assembled with a back cover to accomplish the liquid crystal display device. The backlight module and the liquid crystal panel need a back plate and a plastic frame member to be assembled into the liquid crystal display module. The back cover at the back surface of the backlight module is used as an appearance member of the display device. Also, the back cover requires an engagement structure to be engaged with the case. As there are many components involved in the arrangement and assembling, it is difficult to reduce the overall size of the display device and implement a slim bezel design. Also, the manufacturing cost of the display device is higher.

The information disclosed in this "BACKGROUND OF THE INVENTION" section is only for enhancing understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device and a backlight module having a smaller overall size, suitable for a slim bezel design, and capable of reducing a manufacturing cost.

Other objects and advantages of the invention are further illustrated by the technical features broadly embodied and described as follows.

In order to achieve one or a portion of or all of the objects or other objects, an embodiment of the invention provides a display device including a backlight module and a display panel. The backlight module includes a frame, a light guide element, and a light source. The light guide element is connected to the frame and has a light incident surface, a light emitting surface, and a back surface. The back surface is opposite to the light emitting surface and serves as an appearance surface of the display device. The light source is disposed in the frame and aligned with the light incident surface. The display panel is connected to the frame, and the light emitting surface faces the display panel.

In order to achieve one or a portion of or all of the objects or other objects, an embodiment of the invention provides a backlight module adapted for a display device. The backlight module includes a frame, a light guide element, and a light source. The light guide element is connected to the frame and has a light incident surface, a light emitting surface, and a back surface. The back surface is opposite to the light emitting surface and serves as an appearance surface of the display device. The light source is disposed in the frame and aligned with the light incident surface.

Based on above, the embodiments of the invention have at least one of the following characteristics. In the backlight module of the display device according to the embodiments of the invention, the light guide element is connected to the frame and forms the appearance member of the display device together with the frame, and the back surface of the light guide element serves as the appearance surface of the display device. Thus, in the embodiments of the invention, the back cover or other components does not need to be additionally disposed at the back surface of the light guide element as an appearance member. Also, it does not require to additionally dispose a corresponding case and an engagement structure at a frame area of the display device to assemble the back cover, either. Accordingly, the display device having the backlight module according to the embodiments of the invention has a desirable appearance. Besides, the backlight module and the display panel are assembled by connecting the display panel with the frame. Thus, it does not need to dispose many components (e.g., a back panel and a plastic frame) inside the display device to assemble the backlight module and the display panel as in the conventional process of assembling. Consequently, the number of components in the display device is reduced, and the manufacturing cost is also reduced. Moreover, the overall size of the display device may also become smaller. Thus, the display device may adopt a slim bezel design more easily. Therefore, the display device and the backlight module thereof according to the embodiments of the invention are lighter and thinner.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
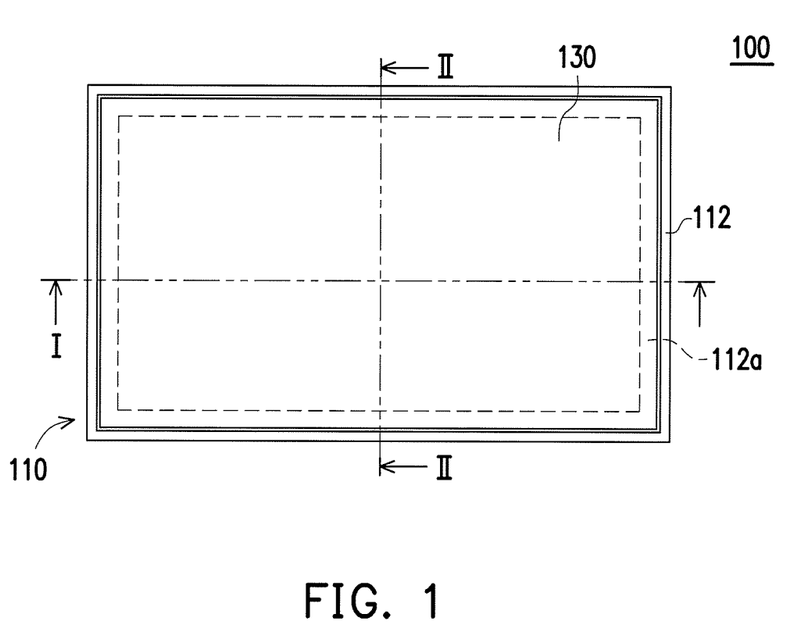
FIG. 1 is a front view illustrating a display device according to an embodiment of the invention.
Figure 2:
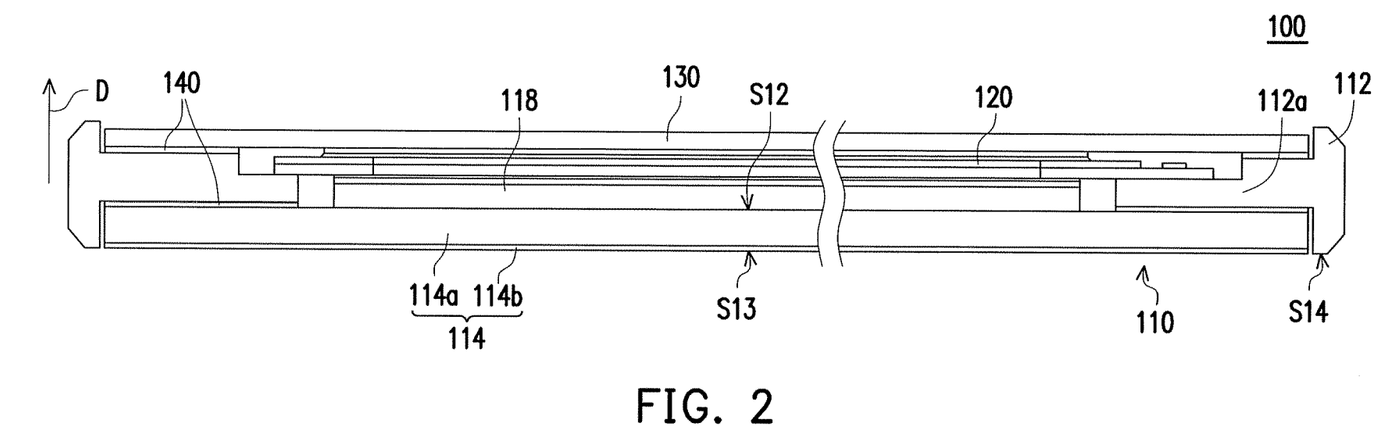
FIG. 2 is a cross-sectional view taken along line I-I of the display device shown in FIG. 1 according to an embodiment of the invention.
Figure 3:
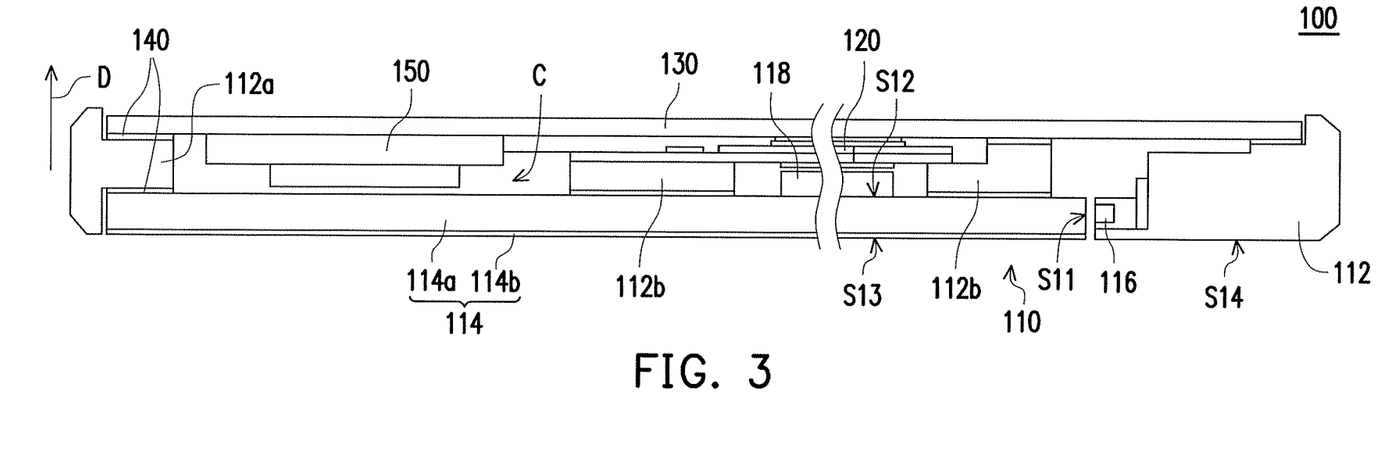
FIG. 3 is a cross-sectional view taken along line II-II of the display device shown in FIG. 1 according to an embodiment of the invention.

FIG. 1 is a front view illustrating a display device according to an embodiment of the invention. FIG. 2 is a cross-sectional view taken along line I-I of the display device shown in FIG. 1 according to an embodiment of the invention. FIG. 3 is a cross-sectional view taken along line II-II of the display device shown in FIG. 1 according to an embodiment of the invention. Referring to FIGS. 1 to 3, a display device 100 of this embodiment includes a backlight module 110 and a display panel 120. The backlight module 110 includes a frame 112, a light guide element 114, and a light source 116. The light guide element 114 is connected to the frame 112 and has a light incident surface S11, a light emitting surface S12, and a back surface S13. The back surface S13 is opposite to the light emitting surface S12 and serves as an appearance surface of the display device 100.

In this embodiment, the light incident surface S11 is connected and perpendicular to the light emitting surface S12. In this embodiment, the light source 116 is a light emitting diode (LED) light source, for example, and disposed in the frame 112. In addition, the light source 116 is aligned with the light incident surface S11 of the light guide element 114. In this embodiment, the display panel 120 is a liquid crystal display panel, for example, and connected to the frame 112. In addition, the light emitting surface S12 of the light guide element 114 faces the display panel 120.

Thus, the light guide element 114 is connected to the frame 112 and forms an appearance member of the display device 100 together with the frame 112. Since the back surface S13 of the light guide element 114 serves as an appearance surface of the display device 100, a back cover or other component does not need to be additionally disposed at the back surface S13 of the light guide element 114 as an appearance member. Also, it does not require to additionally dispose a corresponding case and an engagement structure at a frame area of the display device 100 to assemble the back cover, either. Besides, the backlight module 110 and the display panel 120 are assembled by connecting the display panel 120 with the frame 112. Thus, it does not need to dispose many components (e.g., a back panel and a plastic frame) inside the display device to assemble the backlight module and the display panel as in the conventional process of assembling. Thus, the number of components in the display device 100 is reduced in this embodiment, and the manufacturing cost is also reduced. Moreover, the overall size of the display device 100 may also become smaller. Thus, the display device 100 may adopt a slim bezel design more easily.

Referring to FIGS. 2 and 3, specifically, the light guide element 114 of this embodiment includes a light guide plate 114a and a reflective layer 114b. The light emitting surface S12 is formed at a surface of the light guide plate 114a facing the display panel 120. The reflective layer 114b is stacked on the light guide plate 114a to form the back surface S13. In this embodiment, a light beam emitted by the light source 116 is adapted to enter the light guide element 114 through the light incident surface S11 and is reflected by the reflective layer 114b to transmit toward the light emitting surface S12. In this embodiment, a material of the light guide element 114 and the light guide plate 114a of the light guide element 114 is glass or other suitable transparent materials, for example, and the reflective layer 114b is a coating layer of silver, aluminum, or other suitable materials, for example. However, the invention is not limited thereto.

Figure 4:
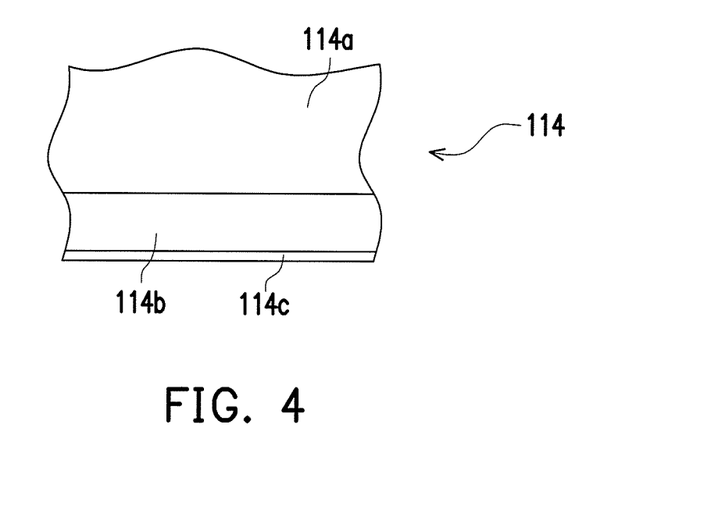
FIG. 4 is an enlarged partial cross-sectional view taken along line I-I or line II-II of the display device shown in FIG. 1 according to another embodiment of the invention.

FIG. 4 is an enlarged partial cross-sectional view taken along line I-I or line II-II of the display device shown in FIG. 1 according to another embodiment of the invention. Referring to FIG. 4, the light guide element 114 of this embodiment further includes a decorating layer 114c. In this embodiment, the reflective layer 114b is interposed between the decorating layer 114c and the light guide plate 114a, and the decorating layer 114c and the reflective layer 114b together form the back surface S13. In this embodiment, the decorating layer 114c allows the appearance surface to have different colors or patterns based on the requirement on appearance. For example, the decorating layer 114c may be a coating layer of ink or other suitable materials. However, the invention is not limited thereto.

Referring to FIG. 3 again, in this embodiment, the frame 112 may shield the light source 116 to prevent the light source 116 from being exposed to affect the appearance of the display device 100 or a light utilization efficiency of the light source 116. Also, the frame 112 has a rear surface S14. The rear surface S14 and the back surface S13 of the light guide element 114 of this embodiment are coplanar and form the appearance surface of the display device 100 together. However, in other embodiments, the rear surface S14 of the frame 112 and the back surface S13 of the light guide element 114 may not be coplanar. It shall be construed that the invention does not intend to impose a limitation in this regard.

Referring to FIGS. 2 and 3 again, the backlight module 110 of this embodiment further includes an optical film set 118. The optical film set 118 is disposed on the light emitting surface S12 of the light guide element 114, and the optical film set 118 and the frame 112 are not overlapped with each other in a light emitting direction D of the light guide element 114. In other words, in this embodiment, the optical film set 118 and the frame 112 are not stacked with respect each other. In addition, the optical film set 118 and the frame 112 do not interfere each other.

Referring to FIGS. 2 and 3 again, the display device 100 of this embodiment further includes a front panel 130. The front panel 130 is a touch panel, for example, and is connected to the frame 112 for the user to input with a touch. The display panel 120 is disposed between the front panel 130 and the light guide element 114, as shown in FIGS. 2 and 3. More specifically, the display panel 120 of this embodiment is located between the front panel 130 and the optical film set 118. In other embodiments, the front panel 130 may also be a transparent cover (e.g., a cover glass) without a touch function, and a material of the front panel 130 may include glass or other suitable transparent materials. However, the invention is not limited thereto.

In this embodiment, an inner edge of the frame 112 has a connection part 112a. The light guide element 114 and the display panel 120 are respectively connected to opposite sides of the connection part 112a, and the optical film set 118 is located between the opposite sides of the connection part 112a. In this embodiment, the connection part 112a may further carries/supports the front panel 130 in addition to carrying/supporting the display panel 120. Specifically, in this embodiment, the light guide element 114 and the front panel 130 are respectively adhered to the opposite sides of the connection part 112a of the frame 112 through an adhesive layer 140, for example, and the display panel 120 and the optical film set 118 are fixed between the light guide element 114 and the front panel 130.

In addition to supporting the display panel 120 and the front panel 130 by using the connection part 112a, the frame 112 of this embodiment may also support the display panel 120 and the front panel 130 by using at least one support part 112b (described as two support parts here as an example), as shown in FIG. 3. Moreover, as shown in FIG. 3, in this embodiment, an accommodating space C is formed between the front panel 130, a side edge of the display panel 120, the frame 112, and the light guide element 114, and at least one electronic element 150 is located in the accommodating space C. In other words, in addition to replacing the back cover in the conventional display device as the appearance member, the light guide element 114 may further serve as a substitute of the back cover of the conventional display device in tennis of the function of carrying/supporting the electronic element. The electronic element 150 is a control circuit board, a flexible circuit board, wirings, or other suitable components of the display panel 120, for example. Here, the wirings may be wirings of electronic components such as an antenna, an image capturing device, or a microphone of the display device 100. However, the invention is not limited thereto.

Figure 5:
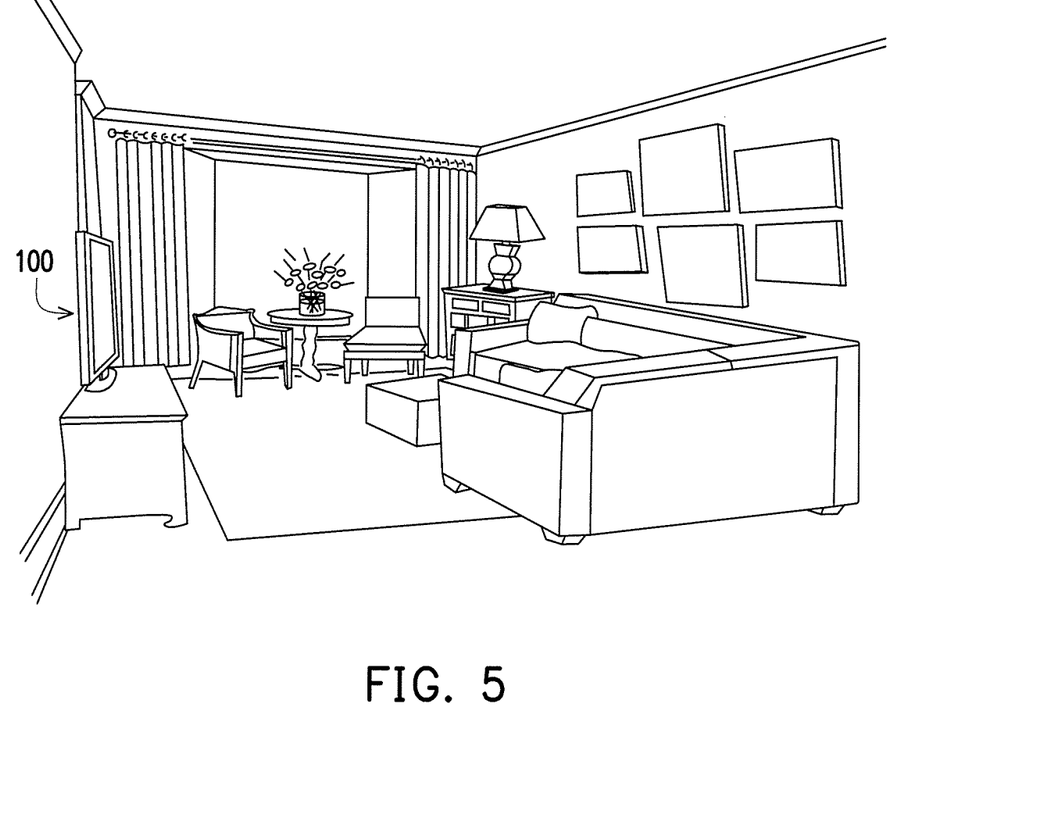
FIG. 5 is a view illustrating an application of the display device shown in FIG. 1 in a household environment.

FIG. 5 is a view illustrating an application of the display device shown in FIG. 1 in a household environment. The display device 100 of this embodiment is a flat panel television, for example, and is disposed in a household environment as shown in FIG. 5. In other embodiments, the display device 100 may also be other electronic devices having a display screen, such as a computer monitor, a notebook computer, a tablet computer, a cellphone, a wearable device, etc. However, the invention is not limited thereto. Also, the display device 100 may be disposed in other environments for the user's viewing.

Figure 6:
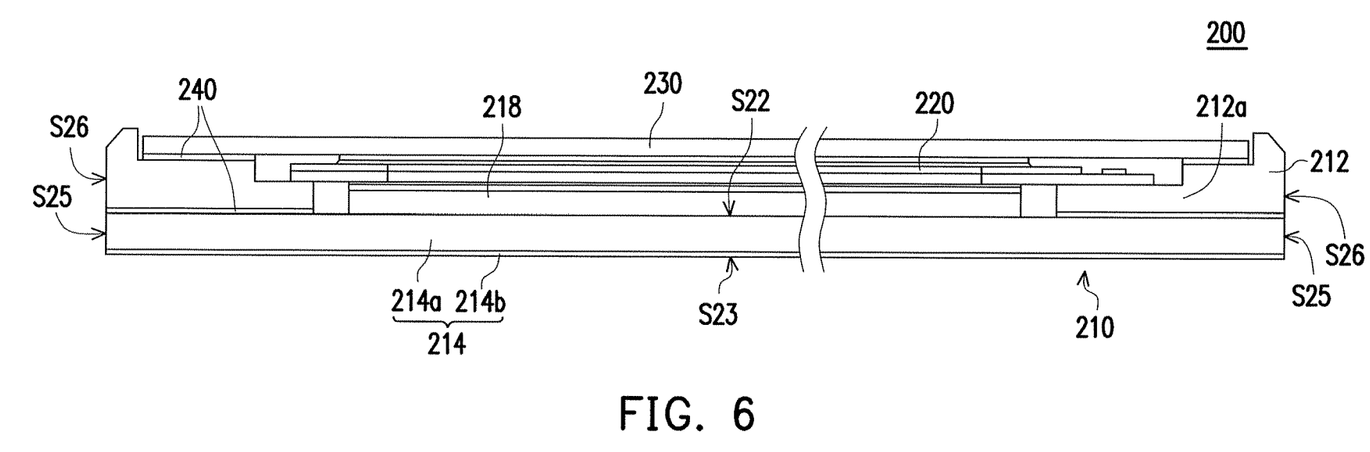
FIG. 6 is a cross-sectional view illustrating a display device according to another embodiment of the invention.

FIG. 6 is a cross-sectional view illustrating a display device according to another embodiment of the invention. In a display device 200 shown in FIG. 6, a backlight module 210, a frame 212, a connection part 212a, a light guide element 214, a light guide plate 214a, a reflective layer 214b, a light emitting surface S22, a back surface S23, an optical film set 218, a display panel 220, a front panel 230, and an adhesive layer 240 are arranged in a way similar to the arrangement of the backlight module 110, the frame 112, the connection part 112a, the light guide element 114, the light guide plate 114a, the reflective layer 114b, the light emitting surface S12, the back surface S13, the optical film set 118, the display panel 120, the front panel 130, and the adhesive layer 140 shown in FIG. 2. Thus, details in this respect will not be repeated in the following. The display device 200 mainly differs from the display device 100 in the following aspects. In this embodiment, the light guide element 214 has at least one first side surface S25 (described as two first side surfaces here as an example). The first side surface S25 is connected between the back surface S23 and the light emitting surface S22 and serve as an appearance surface of the display device 200. In this embodiment, the frame 212 also has at least one second side surface S26 (described as two second side surfaces here as an example). The second side surface S26 is also an appearance surface of the display device 200. In addition, the first side surface S25 and the second side surface S26 are coplanar.

Figure 7:
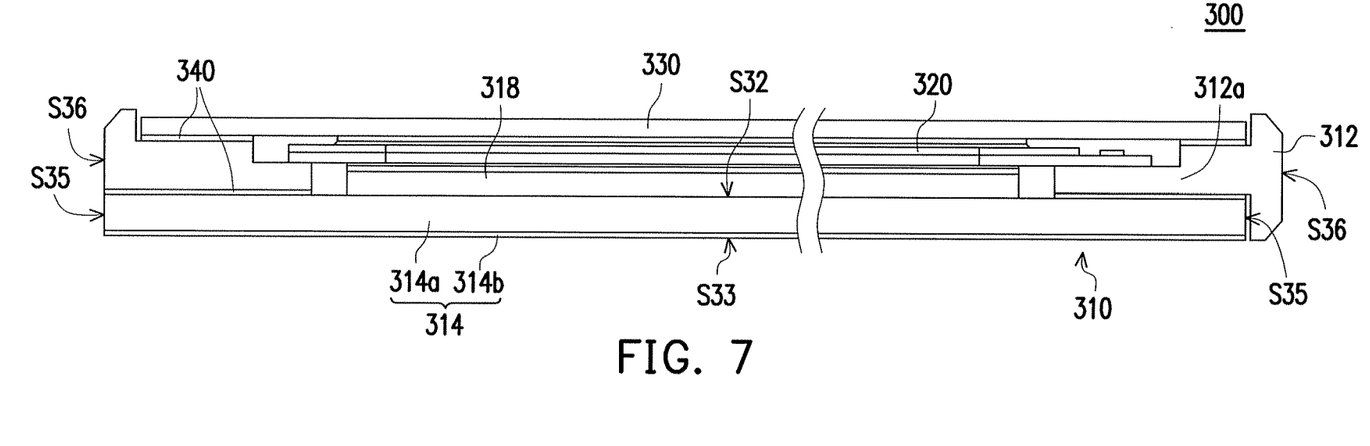
FIG. 7 is a cross-sectional view illustrating a display device according to another embodiment of the invention.

FIG. 7 is a cross-sectional view illustrating a display device according to another embodiment of the invention. In a display device 300 shown in FIG. 7, a backlight module 310, a frame 312, a second side surface S36 a connection part 312a, a light guide element 314, a light guide plate 314a, a reflective layer 314b, a light emitting surface S32, a back surface S33, a first side surface S35, an optical film set 318, a display panel 320, a front panel 330, and an adhesive layer 340 are arranged in a way similar to the arrangement of the backlight module 210, the frame 212, the second side surface S26, the connection part 212a, the light guide element 214, the light guide plate 214a, the reflective layer 214b, the light emitting surface S22, the back surface S23, the first side surface S25, the optical film set 218, the display panel 220, the front panel 230, and the adhesive layer 240 shown in FIG. 6. Thus, details in this respect will not be repeated in the following. The display device 300 mainly differs from the display device 200 as in the following aspect. In the light guide element 314 of this embodiment, only a portion of the first side surfaces S35 (the first side surface S35 at the left side, for example) is coplanar with the second side surface S36 of the frame 312 and serves as an appearance surface. Also, another part of the first side surfaces S35 (the first side surface S35 at the right side, which is not coplanar with the second side surface S36 of the frame 312, is illustrated herein as an example) of the light guide element 314 of this embodiment is shielded by the frame 312 and does not serve as an appearance surface.

Figure 8:
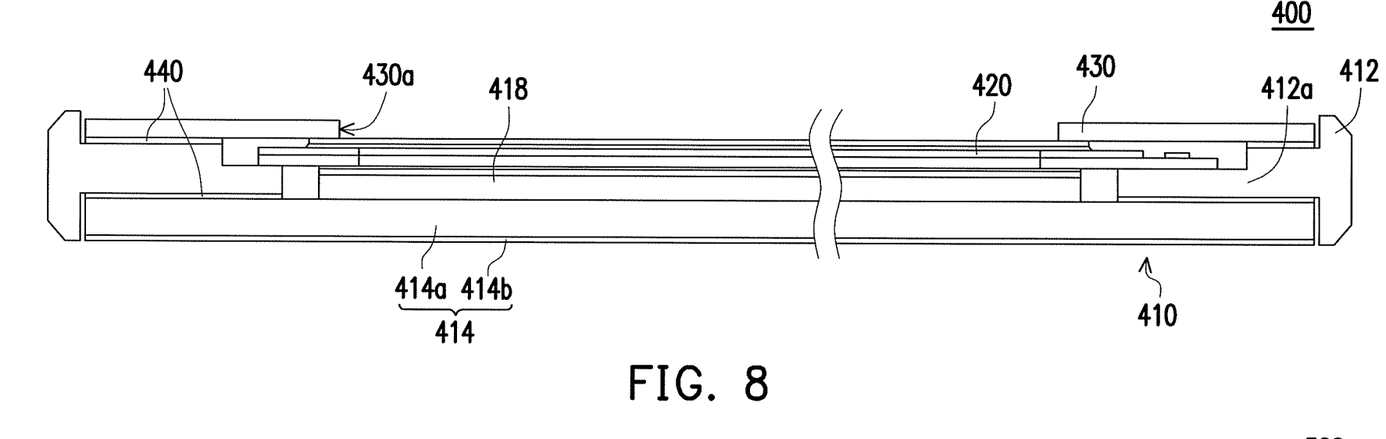
FIG. 8 is a cross-sectional view illustrating a display device according to another embodiment of the invention.

FIG. 8 is a cross-sectional view illustrating a display device according to another embodiment of the invention. In a display device 400 shown in FIG. 8, a backlight module 410, a frame 412, a connection part 412a, a light guide element 414, a light guide plate 414a, a reflective layer 414b, an optical film set 418, a display panel 420, and an adhesive layer 440 are arranged in a way similar to the arrangement of the backlight module 110, the frame 112, the connection part 112a, the light guide element 114, the light guide plate 114a, the reflective layer 114b, the optical film set 118, the display panel 120, and the adhesive layer 140 shown in FIG. 2. Thus, details in this respect will not be repeated in the following. The display device 400 mainly differs from the display device 100 in that the front panel 430 of this embodiment is a front frame and has an opening 430a, such that a portion of the display panel 420 is exposed by the opening 430a.

Figure 9:
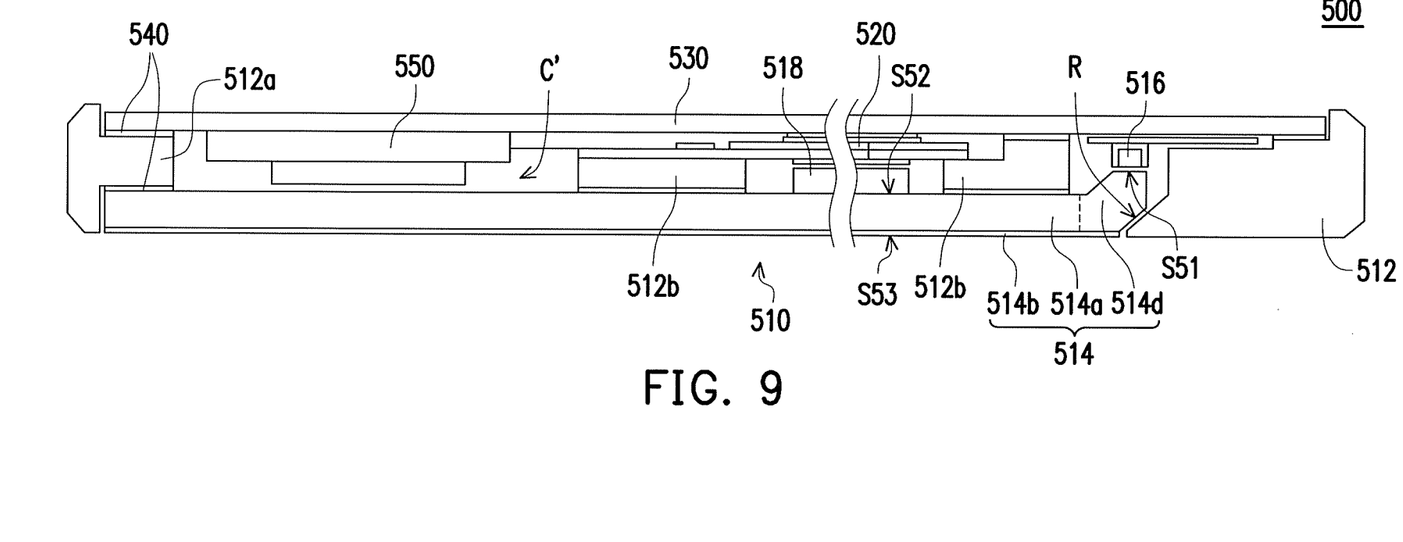
FIG. 9 is a cross-sectional view illustrating a display device according to another embodiment of the invention.

FIG. 9 is a cross-sectional view illustrating a display device according to another embodiment of the invention. In a display device 500 shown in FIG. 9, a backlight module 510, a frame 512, a connection part 512a, a support part 512b, a light guide element 514, a light guide plate 514a, a reflective layer 514b, a light emitting surface S52, a back surface S53, a light source 516, an optical film set 518, a display panel 520, a front panel 530, an adhesive layer 540, an electronic element 550, and an accommodating space C' are arranged in a way similar to the arrangement of the backlight module 110, the frame 112, the connection part 112a, the support part 112b, the light guide element 114, the light guide plate 114a, the reflective layer 114b, the light emitting surface S12, the back surface S13, the light source 116, the optical film set 118, the display panel 120, the front panel 130, the adhesive layer 140, the electronic element 150, and the accommodating space C shown in FIG. 3. Thus, details in this respect will not be repeated in the following.

The display device 500 shown in FIG. 9 mainly differs from the display device 100 shown in FIG. 3 as in the following aspect. In this embodiment, the light guide element 514 further includes a light guide structure 514d. The light guide structure 514d is connected to the light guide plate 514a. In this embodiment, a light incident surface S51 is formed at the light guide structure 514d and separated from the light emitting surface S52. The frame shields the light source 516, the light incident surface S51, and at least a portion of the light guide structure 514d. In this embodiment, the light guide structure 514d has a reflective surface R. The reflective surface R is inclined with respect to the light incident surface S51 and the light emitting surface S52, and the light incident surface S51 is parallel to the light emitting surface S52. In this embodiment, a light beam emitted by the light source 516 is adapted to enter the light guide structure 514d through the light incident surface S51, and is reflected by the reflective surface R to enter the light guide plate 514a in a direction parallel to the light emitting surface S52. By using the light guide structure 514d and the reflective surface R thereof, the light beam emitted by the light source 516 may enter the light guide plate 514a by turning a direction. Thus, the light source 516 may be disposed at a position relatively distant from the back surface S53 of the light guide element 514. Accordingly, the light source 516 may easily be hidden inside the display device 500 without being exposed by the frame 512 at the back surface S53, so as to prevent the appearance of the display device 500 or a light utilization efficiency of the light source 516 from being affected due to exposure of the light source 516.

Figure 10:
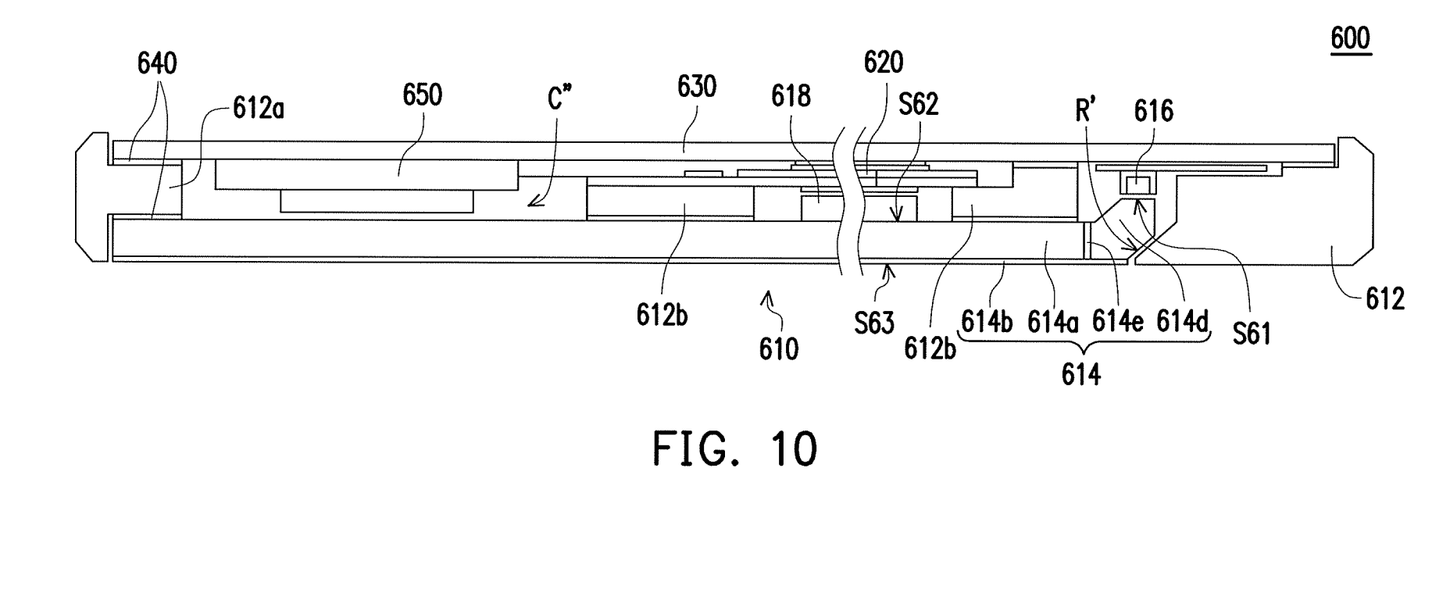
FIG. 10 is a cross-sectional view illustrating a display device according to another embodiment of the invention.

In the embodiment shown in FIG. 9, the light guide structure 514d and the light guide plate 514a are integrally formed. However, the invention is not limited thereto. Details in this respect are further described with reference to the drawings. FIG. 10 is a cross-sectional view illustrating a display device according to another embodiment of the invention. In a display device 600 shown in FIG. 10, a backlight module 610, a frame 612, a connection part 612a, a support part 612b, a light guide element 614, a light guide plate 614a, a reflective layer 614b, a light guide structure 614d, a light incident surface S61, a light emitting surface S62, a back surface S63, a reflective surface R', a light source 616, an optical film set 618, a display panel 620, a front panel 630, an adhesive layer 640, an electronic element 650, and an accommodating space C" are arranged in a way similar to the arrangement of the backlight module 510, the frame 512, the connection part 512a, the support part 512b, the light guide element 514, the light guide plate 514a, the reflective layer 514b, the light guide structure 514d, the light incident surface S51, the light emitting surface S52, the back surface S53, the reflective surface R, the light source 516, the optical film set 518, the display panel 520, the front panel 530, the adhesive layer 540, the electronic element 550, and the accommodating space C' shown in FIG. 9. Thus, details in this respect will not be repeated in the following. The display device 600 mainly differs from the display device 500 in that the light guide structure 614d and the light guide plate 614a of this embodiment are not integrally formed. The light guide structure 614d is adhered to the light guide plate 614a by using an optical adhesive 614e, for example.

In view of the foregoing, the embodiments of the invention have at least one of the following characteristics. In the backlight module of the display device according to the embodiments of the invention, the light guide element is connected to the frame and forms the appearance member of the display device together with the frame, and the back surface of the light guide element serves as the appearance surface of the display device. Thus, in the embodiments of the invention, the back cover or other components does not need to be additionally disposed at the back surface of the light guide element as an appearance member. Also, it does not require to additionally dispose a corresponding case and an engagement structure at a frame area of the display device to assemble the back cover, either. Accordingly, the display device having the backlight module according to the embodiments of the invention has a desirable appearance. Besides, the backlight module and the display panel are assembled by connecting the display panel with the frame. Thus, it does not need to dispose many components (e.g., a back panel and a plastic frame) inside the display device to assemble the backlight module and the display panel as in the conventional process of assembling. Consequently, the number of components in the display device is reduced, and the manufacturing cost is also reduced. Moreover, the overall size of the display device may also become smaller. Thus, the display device may adopt a slim bezel design more easily. Therefore, the display device and the backlight module thereof according to the embodiments of the invention are lighter and thinner. Furthermore, in the embodiments of the invention, the light incident surface of the light guide element and the light source aligned with the light incident surface may be designed to be shielded by the frame in the display device. Thus, the display device may have a preferable appearance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
a backlight module, comprising:
a frame;
a light guide element connected to the frame and having a light incident surface, a light emitting surface, and a back surface, wherein the back surface is opposite to the light emitting surface and entirely serves as an appearance surface of the display device without being covered by the frame; and
a light source, disposed in the frame and aligned with the light incident surface; and
a display panel, connected to the frame, wherein the light emitting surface faces the display panel.

2. The display device as claimed in claim 1, wherein the light guide element comprises a light guide plate and a reflective layer, the light emitting surface is formed at a surface of the light guide plate facing the display panel, the light incident surface is connected and perpendicular to the light emitting surface, the reflective layer is stacked on the light guide plate to form the back surface, the light source is adapted to emit a light beam, and the light beam is adapted to enter the light guide element through the light incident surface and is reflected by the reflective layer to be transmitted toward the light emitting surface.

3. The display device as claimed in claim 2, wherein the light guide element further comprises a decorating layer, the reflective layer is interposed between the decorating layer and the light guide plate, and the decorating layer and the reflective layer together form the back surface.

4. The display device as claimed in claim 1, wherein the frame has a rear surface, and the rear surface is coplanar with the back surface of the light guide element.

5. The display device as claimed in claim 1, wherein the light guide element has at least one first side surface, the at least one first side surface is connected between the back surface and the light emitting surface and serves as an appearance surface of the display device, the frame has at least one second side surface, and the at least one first side surface is coplanar with the at least one second side surface.

6. The display device as claimed in claim 1, wherein the backlight module further comprises an optical film set, the optical film set is disposed at the light emitting surface of the light guide element, and the optical film set and the frame are not overlapped with each other in a light emitting direction of the light guide element.

7. The display device as claimed in claim 1, wherein a material of the light guide element comprises glass.

8. The display device as claimed in claim 1, wherein the light guide element comprises a light guide plate and a light guide structure, the light emitting surface is formed on a surface of the light guide plate facing the display panel, the light incident surface is formed at the light guide structure, the light guide structure is connected to the light guide plate, and the frame shields the light source, the light incident surface, and at least a portion of the light guide structure.

9. The display device as claimed in claim 8, wherein the light guide structure has a reflective surface, the reflective surface is inclined with respect to the light emitting surface, the light incident surface is parallel to the light emitting surface, the light source is adapted to emit a light beam, and the light beam is adapted to enter the light guide structure through the light incident surface and is reflected by the reflective surface to enter the light guide plate along a direction parallel to the light emitting surface.

10. The display device as claimed in claim 8, wherein the light guide structure and the light guide plate are integrally formed.

11. The display device as claimed in claim 8, wherein the light guide structure is adhered to the light guide plate by using an optical adhesive.

12. The display device as claimed in claim 1, wherein an inner edge of the frame has a connection part, and the light guide element and the display panel are respectively connected to opposite sides of the connection part.

13. The display device as claimed in claim 1, further comprising a front panel, wherein the front panel is connected to the frame, and the display panel is located between the front panel and the light guide element.

14. The display device as claimed in claim 13, wherein the front panel is a touch panel or a transparent cover.

15. The display device as claimed in claim 13, wherein an accommodating space is formed between the front panel, the frame, and the light guide element, and at least one electronic element is located in the accommodating space.

16. The display device as claimed in claim 13, wherein the front panel is a front frame, and the front frame exposes a portion of the display panel.

17. A backlight module, adapted for a display device and comprising:
   a frame;
   a light guide element connected to the frame and having a light incident surface, a light emitting surface, and a back surface, wherein the back surface is opposite to the light emitting surface and entirely serves as an appearance surface of the display device without being covered by the frame; and
   a light source, disposed in the frame and aligned with the light incident surface.

18. The backlight module as claimed in claim 17, wherein the light guide element comprises a light guide plate and a reflective layer, the light emitting surface is formed at the light guide plate, the light incident surface is connected and perpendicular to the light emitting surface, the reflective layer is stacked on the light guide plate to form the back surface, the light source is adapted to emit a light beam, and the light beam is adapted to enter the light guide element through the light incident surface and is reflected by the reflective layer to be transmitted toward the light emitting surface.

19. The backlight module as claimed in claim 18, wherein the light guide element further comprises a decorating layer, the reflective layer is interposed between the decorating layer and the light guide plate, and the decorating layer and the reflective layer together form the back surface.

20. The backlight module as claimed in claim 17, wherein the frame has a rear surface, and the rear surface is coplanar with the back surface of the light guide element.

21. The backlight module as claimed in claim 17, wherein the light guide element has at least one first side surface, the at least one first side surface is connected between the back surface and the light emitting surface and serves as an appearance surface of the display device, the frame has at least one second side surface, and the at least one first side surface is coplanar with the at least one second side surface.

22. The backlight module as claimed in claim 17, further comprising an optical film set, wherein the optical film set is disposed at the light emitting surface of the light guide element, and the optical film set and the frame are not overlapped with each other in a light emitting direction of the light guide element.

23. The backlight module as claimed in claim 17, wherein a material of the light guide element comprises glass.

24. The backlight module as claimed in claim 17, wherein the light guide element comprises a light guide plate and a light guide structure, the light emitting surface is formed at the light guide plate, the light incident surface is formed at the light guide structure, the light guide structure is connected to the light guide plate, and the frame shields the light source, the light incident surface, and at least a portion of the light guide structure.

25. The backlight module as claimed in claim 24, wherein the light guide structure has a reflective surface, the reflective surface is inclined with respect to the light emitting surface, the light incident surface is parallel to the light emitting surface, the light source is adapted to emit a light beam, and the light beam is adapted to enter the light guide structure through the light incident surface and is reflected by the reflective surface to enter the light guide plate along a direction parallel to the light emitting surface.

26. The backlight module as claimed in claim 24, wherein the light guide structure and the light guide plate are integrally formed.

27. The backlight module as claimed in claim 24, wherein the light guide structure is adhered to the light guide plate by using an optical adhesive.

28. A display device, comprising:
   a backlight module, comprising:
      a frame;
      a light guide element connected to the frame and having a light incident surface, a light emitting surface, and a back surface, wherein the back surface is opposite to the light emitting surface and serves as an appearance surface of the display device; and
      a light source, disposed in the frame and aligned with the light incident surface; and
   a display panel, connected to the frame, wherein the light emitting surface faces the display panel,
   wherein the light guide element has at least one first side surface, the at least one first side surface is connected between the back surface and the light emitting surface and serves as an appearance surface of the display device, the frame has at least one second side surface, and the at least one first side surface is coplanar with the at least one second side surface.

29. A backlight module, adapted for a display device and comprising:
   a frame;
   a light guide element connected to the frame and having a light incident surface, a light emitting surface, and a back surface, wherein the back surface is opposite to the light emitting surface and serves as an appearance surface of the display device; and
   a light source, disposed in the frame and aligned with the light incident surface,
   wherein the light guide element has at least one first side surface, the at least one first side surface is connected between the back surface and the light emitting surface and serves as an appearance surface of the display device, the frame has at least one second side surface, and the at least one first side surface is coplanar with the at least one second side surface.

* * * * *